United States Patent
Serafin (10) Patent No.: US 12,175,595 B2
(45) Date of Patent: Dec. 24, 2024

(54) SYSTEM AND METHOD FOR OPTIMIZING A BOUNDING BOX USING AN ITERATIVE CLOSEST POINT ALGORITHM

(71) Applicant: Toyota Research Institute, Inc., Los Altos, CA (US)

(72) Inventor: Jacopo Serafin, Los Altos, CA (US)

(73) Assignees: Toyota Research Institute, Inc., Los Altos, CA (US); Toyota Jidosha Kabushiki Kaisha, Aichi-ken (JP)

( * ) Notice: Subject to any disclaimer, the term of this patent is extended or adjusted under 35 U.S.C. 154(b) by 372 days.

(21) Appl. No.: 17/733,150

(22) Filed: Apr. 29, 2022

(65) Prior Publication Data

US 2023/0351679 A1    Nov. 2, 2023

(51) Int. Cl.
    *G06T 17/00*   (2006.01)
    *G01S 17/89*   (2020.01)
    *G06T 7/73*    (2017.01)

(52) U.S. Cl.
    CPC .............. *G06T 17/00* (2013.01); *G01S 17/89* (2013.01); *G06T 7/73* (2017.01); *G06T 2207/10028* (2013.01); *G06T 2210/12* (2013.01)

(58) Field of Classification Search
    CPC ........... G06T 7/73; G06T 17/00; G06T 17/89; G06T 2207/10028; G06T 2210/12
    See application file for complete search history.

(56) References Cited

U.S. PATENT DOCUMENTS

| | | | |
|---|---|---|---|
| 9,600,892 B2 | 3/2017 | Patel et al. | |
| 10,311,648 B2* | 6/2019 | Murali | H04N 13/239 |
| 10,776,983 B2* | 9/2020 | Kulkarni | G06V 20/58 |
| 10,962,630 B1* | 3/2021 | Walls | G01S 7/4972 |
| 11,126,197 B2* | 9/2021 | Chen | G05D 1/0088 |
| 11,315,269 B2* | 4/2022 | Vaquero Gomez | G06T 7/521 |
| 11,585,923 B2* | 2/2023 | Taalimi | G06N 7/01 |
| 2016/0154999 A1 | 6/2016 | Fan et al. | |
| 2017/0116781 A1 | 4/2017 | Babahajiani | |
| 2020/0134372 A1 | 4/2020 | Chowdhury et al. | |
| 2020/0320339 A1* | 10/2020 | Rawashdeh | G01S 17/42 |
| 2023/0041031 A1* | 2/2023 | Baldan | B60W 60/001 |
| 2023/0306626 A1* | 9/2023 | Cho | G06T 7/33 |
| 2023/0350034 A1* | 11/2023 | Serafin | G01S 17/931 |

OTHER PUBLICATIONS

Xin, Wei, and Jiexin Pu. "An improved ICP algorithm for point cloud registration", 2010 International Conference on Computational and Information Sciences, IEEE (Year: 2010).*

Marani, Roberto, et al. "A modified iterative closest point algorithm for 3D point cloud registration", ComputerâAided Civil and Infrastructure Engineering 31(7): 515-534 (Year: 2016).*

(Continued)

*Primary Examiner* — Scott A Rogers
(74) *Attorney, Agent, or Firm* — Christopher G. Darrow; Darrow Mustafa PC (57) ABSTRACT

Systems and methods are described for optimizing bounding boxes generated using point cloud information. In one example, a method for optimizing the bounding box includes the step of using an iterative closest point (ICP) algorithm to transform the bounding box using a transformation. The point cloud acts as the reference for the ICP algorithm, while the bounding box acts as the source for the ICP algorithm.

17 Claims, 7 Drawing Sheets

(56) References Cited

OTHER PUBLICATIONS

Jiahao Li et al. "Iterative Distance-Aware Similarity Matrix Convolution with Mutual-Supervised Point Elimination for Efficient Point Cloud Registration." European Conference on Computer Vision. 2020.
Juyong Zhang et al. "Fast and Robust Iterative Closest Point." IEEE Transactions on Pattern Analysis and Machine Intelligence. 2021.

* cited by examiner

FIG. 7

SYSTEM AND METHOD FOR OPTIMIZING A BOUNDING BOX USING AN ITERATIVE CLOSEST POINT ALGORITHM

TECHNICAL FIELD

The subject matter described herein relates, in general, to systems and methods for optimizing bounding boxes and, more specifically, to systems and methods for optimizing the rotation, translation, and/or scale of bounding boxes.

BACKGROUND

The background description provided is to present the context of the disclosure generally. Work of the inventor, to the extent it may be described in this background section, and aspects of the description that may not otherwise qualify as prior art at the time of filing are neither expressly nor impliedly admitted as prior art against the present technology.

Some current devices, such as vehicles, have sensors that collect data and provide this data to detection systems. In turn, these detection systems output bounding boxes of objects detected within the collected data that generally outline the object. Bounding boxes are typically utilized in object detection and may be either two-dimensional or three-dimensional and are generally in the shape of a rectangle or rectangular prism, respectively. In some cases, bounding boxes specify the position of the object, object class, and/or a confidence interval indicating how likely the object is at the location indicated by the bounding box.

The bounding boxes generated by the detection systems may not always match up with the point cloud data. More specifically, in some cases, the rotation, translation, and/or scale of the bounding box is sometimes incorrect and does not match the point cloud data. This incorrect rotation, translation, and/or scale of the bounding box can be problematic, especially for downstream processes relying on bounding boxes that correctly spatially describe objects.

SUMMARY

This section generally summarizes the disclosure and is not a comprehensive explanation of its full scope or all its features.

In one embodiment, a system for optimizing a bounding box includes a processor and a memory in communication with the processor. The memory includes an optimizing module having instructions that, when executed by the processor, cause the processor to use an iterative closest point (ICP) algorithm to transform the bounding box using a transformation. The point cloud acts as the reference for the ICP algorithm, while the bounding box acts as the source for the ICP algorithm. By so doing, the rotation, translation, and/or scale of the bounding box can be optimized to better match the point cloud and the object on which the point cloud represents.

In another embodiment, a method for optimizing a bounding box includes the step of using an ICP algorithm to transform the bounding box using a transformation. Like before, the point cloud acts as the reference for the ICP algorithm, while the bounding box acts as the source for the ICP algorithm.

In yet another embodiment, a non-transitory computer-readable medium stores instructions for optimizing a bounding box generated based on a point cloud. In this embodiment, the instructions stored within the non-transitory computer-readable medium, upon execution by a processor, cause a processor to use an ICP algorithm to transform the bounding box using a transformation. Again, the point cloud acts as the reference for the ICP algorithm, while the bounding box acts as the source for the ICP algorithm.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for optimizing the rotation, translation, and/or scale of a bounding box using an ICP algorithm. In prior art solutions, a detector receives a point cloud that may be in the form of a point cloud generated by a light detection and ranging (LIDAR) sensor and/or a pseudo-LIDAR point cloud generated from one or more images captured by cameras. Based on these point clouds, the detector typically outputs one or more bounding boxes indicating the presence of objects. Bounding boxes generally outline the detected object and are generally in the shape of a rectangle or rectangular prism. In some cases, bounding boxes specify the position of the object, object class, and/or a confidence interval indicating how likely the object is at the location indicated by the bounding box. However, the current technology sometimes generates outputs bounding boxes that do not have the correct rotation, translation, and/or scale representative of the point cloud on which it is based.

The systems and methods described herein can optimize the rotation, translation, and/or scale of the bounding box to more correctly match the point cloud on which the bounding box is based. As will be described in greater detail later, the systems and methods utilize an ICP algorithm that utilizes the point cloud as a reference and the bounding box as a source for the ICP algorithm. ICP algorithms are generally utilized to minimize the difference between two point clouds. However, the systems and methods described herein use ICP algorithms to minimize the difference between the point cloud and the bounding box that was generated based on the point cloud. By so doing, the bounding box can be optimized such that the rotation, translation, and/or scale of the bounding box better matches the point cloud on which it is based.

The systems and methods for optimizing a bounding box can be incorporated into any one of several different devices and/or structures and can have a variety of applications. One such application incorporates the bounding box optimizing system in a vehicle that can detect objects for safety and/or path planning purposes. Again, it should be understood that the bounding box optimizing system described should not be limited to one particular use, such as a vehicle.

Figure 1:
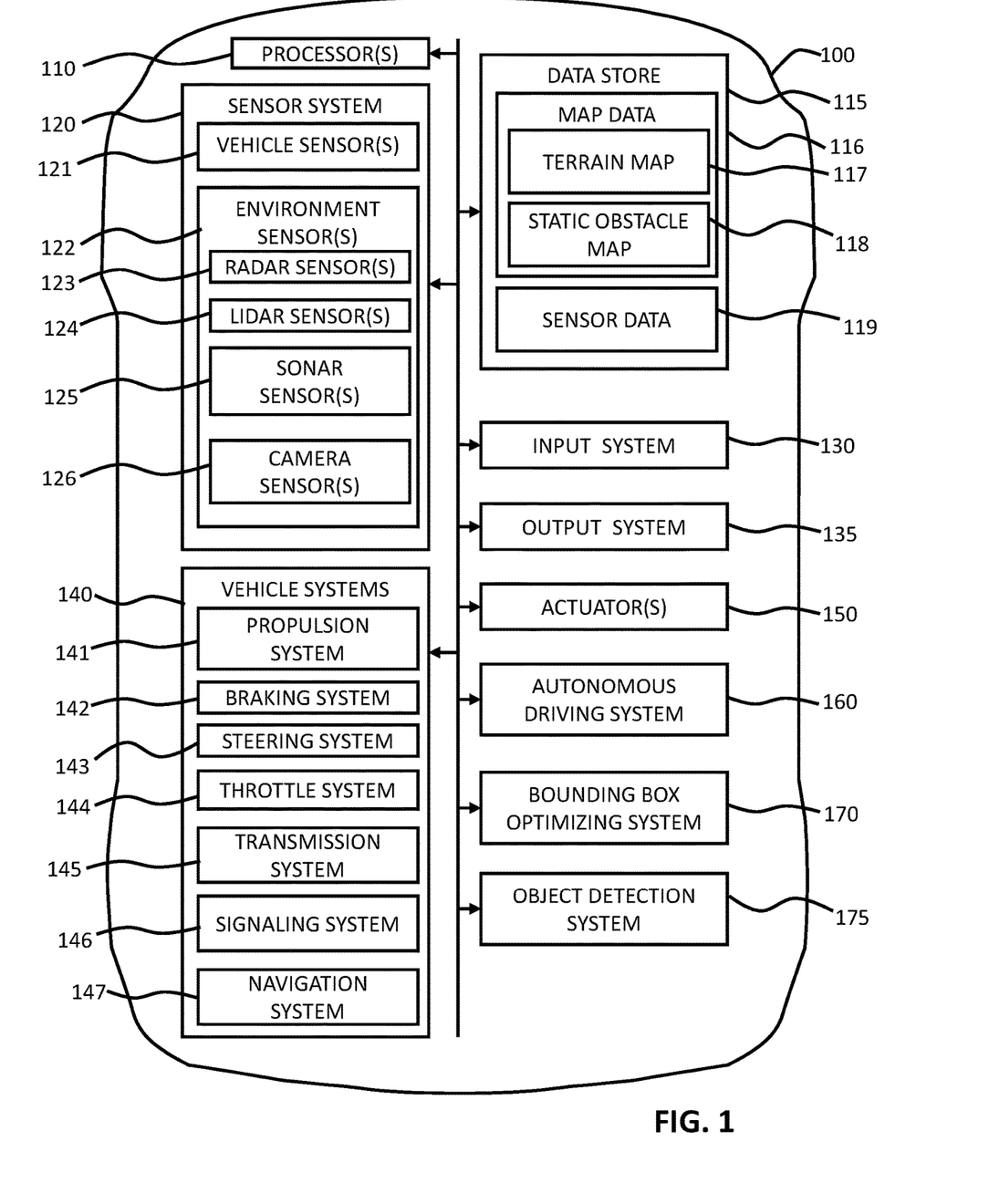
FIG. 1 illustrates a vehicle incorporating a bounding box optimizing system.

With this understanding, referring to FIG. 1, an example of a vehicle 100 is illustrated. As used herein, a "vehicle" is any form of powered transport. In one or more implementations, the vehicle 100 is an automobile. In some implementations, the vehicle 100 may be any robotic device or form of powered transport that, for example, includes one or more automated or autonomous systems, and thus benefits from the functionality discussed herein.

The automated/autonomous systems or combination of systems may vary in different embodiments. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a bounding box optimizing system 170. The bounding box optimizing system 170 may be incorporated within the autonomous driving system 160 or may be separate, as shown. Briefly, the bounding box optimizing system 170 may receive a point cloud and generates one or more bounding boxes of objects detected in the point cloud. In addition, the bounding box optimizing system 170 can optimize the rotation, translation, and/or scale of the bounding box to more correctly match the point cloud on which the bounding box is based by utilizing an ICP algorithm that uses the point cloud as a reference and the bounding box as a source for the ICP algorithm.

Figure 2:
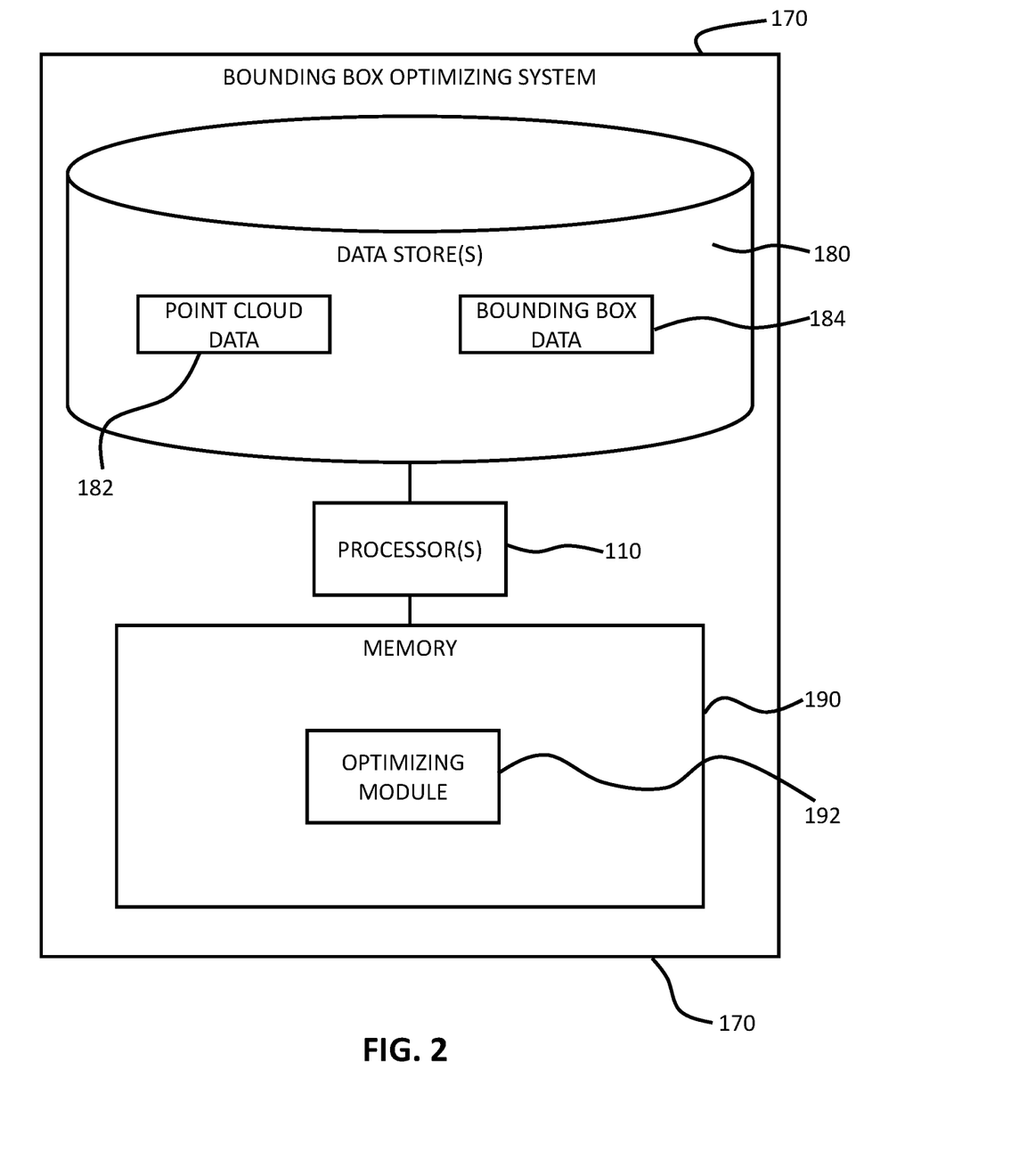
FIG. 2 illustrates a more detailed view of the bounding box optimizing system of FIG. 1.

With reference to FIG. 2, one embodiment of the bounding box optimizing system 170 is further illustrated. As shown, the bounding box optimizing system 170 includes one or more processor(s) 110. Accordingly, the processor(s) 110 may be a part of the bounding box optimizing system 170 or the bounding box optimizing system 170 may access the processor(s) 110 through a data bus or another communication path. In one or more embodiments, the processor(s) 110 is an application-specific integrated circuit that is configured to implement functions associated with an optimizing module 192. In general, the processor(s) 110 is an electronic processor such as a microprocessor that is capable of performing various functions as described herein.

In one embodiment, the bounding box optimizing system 170 includes a memory 190 that stores the optimizing module 192. The memory 190 is a random-access memory (RAM), read-only memory (ROM), a hard disk drive, a flash memory, or other suitable memory for storing the optimizing module 192. The optimizing module 192 is, for example, computer-readable instructions that, when executed by the processor(s) 110, cause the processor(s) 110 to perform the various functions disclosed herein.

Furthermore, in one embodiment, the bounding box optimizing system 170 includes a data store(s) 180. The data store(s) 180 is, in one embodiment, an electronic data structure such as a database that is stored in the memory 190 or another memory and that is configured with routines that can be executed by the processor(s) 110 for analyzing stored data, providing stored data, organizing stored data, and so on. Thus, in one embodiment, the data store(s) 180 stores data used by the optimizing module 192 in executing various functions. In one embodiment, the data store(s) 180 includes point cloud data 182 and/or bounding box data 184, along with, for example, other information that is used by the optimizing module 192.

The point cloud data 182 may include one or more point clouds. Generally, a point cloud is a data structure that includes a set of data points in space. The points may represent a two-dimensional and/or three-dimensional shape or object. Each point position may have a set of coordinates indicating its location.

The one or more point clouds making up point cloud data 182 may have been generated from information from one or more sensors. For example, the point cloud data 182 could include one or more point clouds generated by the LIDAR sensor(s) 124 of the sensor system 120 of FIG. 1. Moreover, the LIDAR sensor(s) 124 targets an object with a laser and measures the time for the reflected light to return to the receiver. Using these measurements, points representing reflections from the surface of an object can be constructed in a point cloud, wherein each point provides a location that represents the surface of the object.

However, the one or more point clouds making of the point cloud data 182 may also be generated in other ways as well. For example, instead of utilizing the LIDAR sensor(s) 124, point clouds can be constructed utilizing image information captured from one or more camera sensor(s) 126 of FIG. 1. These types of point clouds are sometimes referred to as pseudo-LIDAR point clouds and are generated by first creating a depth map of the image and then back projecting the depth map into a three-dimensional space to generate the pseudo-LIDAR point cloud.

Regarding the bounding box data 184, this data can include information regarding bounding boxes that were generated using the point cloud data 182. As previously mentioned, bounding boxes are used to describe the spatial location of an object. Generally, the bounding boxes may be rectangular and generally outline the location of an object in a two-dimensional or three-dimensional space. The bounding box may also include additional information regarding the type of object and a confidence rating indicating how likely the bounding box correctly describes the spatial location of the object.

The bounding boxes of the bounding box data 184 are based on the point cloud data 182. Essentially, an object detection system 175 receives, as an input, the point cloud data 182. From there, the object detection system 175 outputs one or more bounding boxes of one or more detected objects that were detected within the point cloud data 182.

As mentioned before, bounding boxes output by the object detection system 175 may not properly match the point cloud from which it was generated. Moreover, bounding boxes output by the object detection system 175 may not have the correct rotation, translation, and/or scale that properly spatially locates the related object. Accordingly, the optimizing module 192 includes instructions that cause the processor(s) 110 to optimize the rotation, translation, and/or scale of the bounding boxes to more precisely match the point cloud data 182 on which they are based.

Figure 3:
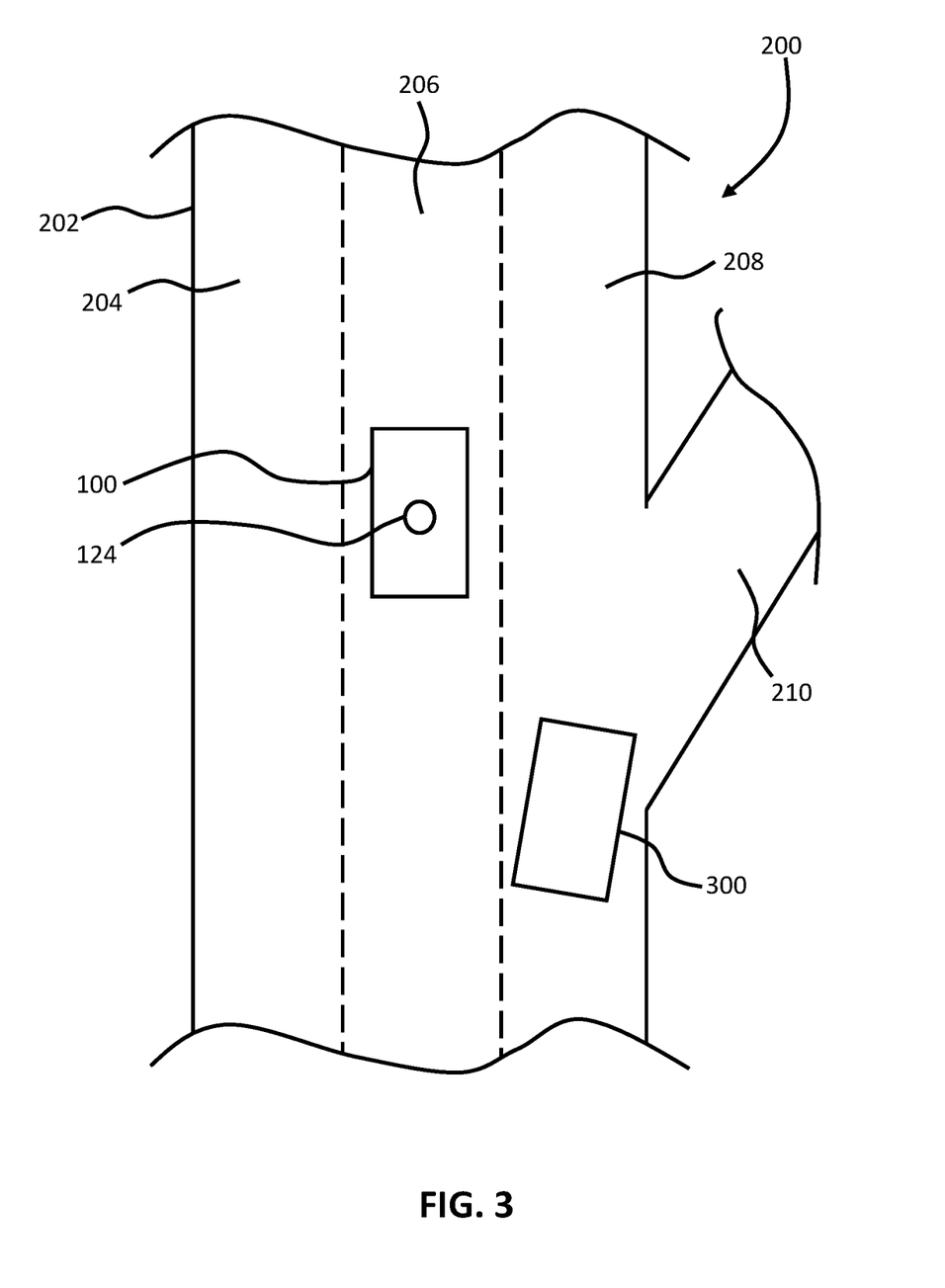
FIG. 3 illustrates a scenario of a vehicle incorporating the bounding box optimizing system traveling on a road nearby another vehicle.

In order to better understand how this occurs, reference is made to FIG. 3, which illustrates scenario 200, which involves the vehicle 100 of FIG. 1 that includes the bounding box optimizing system 170 of FIG. 2. It should be understood that the scenario 200 is one example of a scenario that may benefit from the bounding box optimizing system 170. In this scenario 200, the vehicle 100 is traveling in an environment that includes a road 202 with lanes 204, 206, and 208. Generally, the lane 204 is the leftmost lane, the lane 206 is the middle lane, and the lane 208 is the right lane. The vehicle 100, which incorporates the bounding box optimizing system 170, is traveling in the center lane 206. Also shown is exit ramp 210 extending from the right lane 208 of the road 202. Another vehicle 300 is traveling in the right lane 208 but intends to utilize the exit ramp 210. As such, the vehicle 300 is in the process of turning onto the exit ramp 210.

The vehicle 100, in this example, is equipped with one or more the LIDAR sensor(s) 124 that are capable of generating point clouds that can be later used by the object detection system 175 to detect one or more objects within the point cloud generated by the LIDAR sensor(s) 124. In this example, the LIDAR sensor(s) 124 output data that may be stored within the data store(s) 180 as the point cloud data 182, which is then utilized by the object detection system 175 to generate bounding boxes of detected objects which are stored in the data store(s) 180 as the bounding box data 184. Again, as mentioned previously, the point clouds can be generated by other types of sensors, such as the camera sensor(s) 126, and are not restricted to being generated by the LIDAR sensor(s) 124.

Figure 4A:
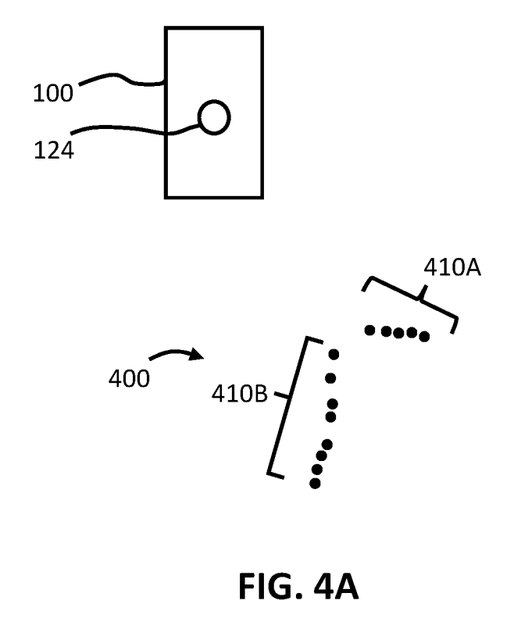
FIGS. 4A and 4B illustrate a point cloud and bounding box, respectively, of the nearby vehicle in the scenario of FIG. 3.

As shown in FIG. 4A, the LIDAR sensor(s) 124 output data that can be used to generate a point cloud 400 that includes a series of points that represent reflections from the surface of the vehicle 300. In this example, the point cloud 400 includes a row of points 410A of points that generally represent the front surface of the vehicle 300 and another row of points 410B that represents the left side surface of the vehicle 300 that generally faces the LIDAR sensor(s) 124. It is worth mentioning that the point cloud 400 does not include points that represent the right side or rear side of the vehicle 300. This is because the LIDAR sensor(s) 124 can only receive reflections from surfaces that are within the line of sight of the LIDAR sensor(s) 124. In this example, the tight side and rear side of the vehicle 300 are obscured by the front side and left side of the vehicle 300.

Figure 4B:
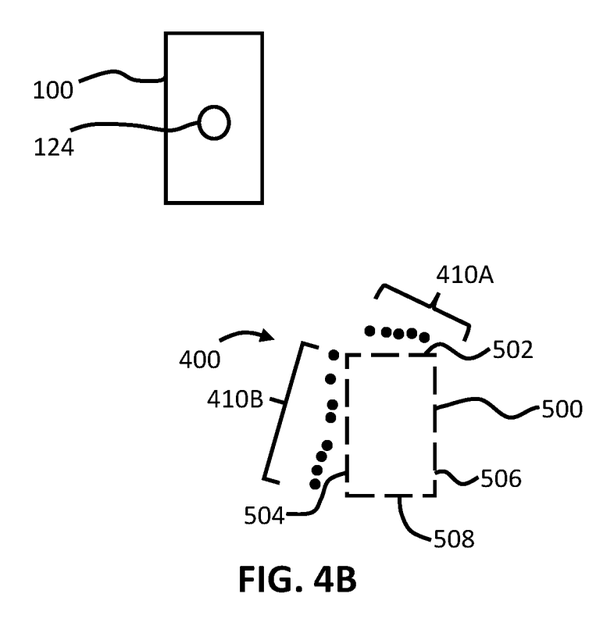

Referring to FIG. 4B, the object detection system 175 and/or the bounding box optimizing system 170 utilizes the point cloud 400 to generate a bounding box 500 that generally outlines an object, in this case, the vehicle 300. In this example, the bounding box includes sides 502, 504, 506, and 508. However, it is worth noting that the bounding box 500 does not precisely outline the vehicle 300. In this example, the bounding box 500 is generally smaller than the vehicle 300. However, in other examples, it may be possible that the bounding box 500 may be larger than the vehicle 300. Additionally, the rotation and translation of the bounding box 500 generally do not match the true rotation and translation of the vehicle 300, as they do not match the points 410A and 410B of the point cloud 400. The bounding box optimizing system 170 can optimize the rotation, translation, and/or scale of the bounding box 500 to better match the points of the point cloud 400.

To achieve this improved matching, the optimizing module 192 includes instructions that, when executed by the processor(s) 110, causes the processor(s) 110 to use an ICP algorithm to transform the bounding box 500 using a transformation. The ICP algorithm uses the point cloud 400 as a reference and the bounding box 500 as a source for the ICP algorithm. As a first step, the ICP algorithm for each of the points 410A and 410B of the point cloud 400 matches the points 410A and 410B to the closest side of the bounding box 500.

Figure 5A:
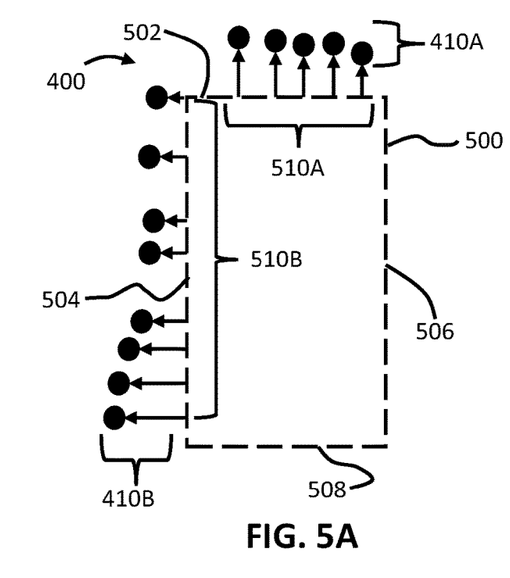
FIGS. 5A-5C illustrate an example of the rotation and translation of a bounding box being iteratively optimized using an ICP algorithm.

For example, referring to FIG. 5A, illustrated is the bounding box 500. Also illustrated are the points 410A and 410B of the point cloud 400. In this example, the points 410A are matched by the ICP algorithm to the side 502, while the points 410B are matched by the ICP algorithm to the side 504. Generally, to determine which points are closest to a particular side of the bounding box 500, distances are measured between the points of the point cloud and the sides of the bounding box 500. The distances may be perpendicular distances between the points of the point cloud and the sides of the bounding box 500. In this example, the points 410A are matched to the side 502 because the distances 510A are the shortest to that particular side. In like manner, the points 410B are matched to the side 506 because distances 510B are shortest to that particular side. As such, each of the points 410A and 410B are matched to a particular side of the bounding box 500 and create a matched set, where each point is matched to a side.

While the points 410A and 410B are matched to a particular side of the bounding box 500 and create a matched set, it should be understood that other types of associations can also be utilized. Moreover, any heuristic of choice can be employed to determine the associations between the points of a point cloud and a side of a bounding box as well as the distances between these associations. For example, a generalized ICP algorithm, sometimes referred to as a GICP algorithm, can exploit the surface normals to reject outliners in the optimization problem.

Next, the optimizing module 192 causes the processor(s) 110 to find the best transformation to apply to the bounding box 500 that jointly minimizes the distances 510A and 510B between the points of the point cloud and the sides 502 and 504, respectively, for each of the match sets. In the example shown in FIG. 5B, the best transformation includes a rotation and translation used to adjust the rotation and translation of the bounding box 500. As such, the rotation and translation of the bounding box 500 of FIG. 5B is such that the bounding box 500 is generally better matched with the points 410A and 410B.

Essentially, the ICP algorithm uses the points 410A and 410B as the reference and the bounding box 500 as the source. As such, the points 410A and 410B are kept fixed, while the bounding box 500 is transformed to best match the points 410A and 410B. The ICP algorithm iteratively revises the transformation needed to minimize an error metric, which, in this example, are the distances 510A and 510B, such as the sum of squared differences between the coordinates of the matched sets. In some embodiments, a least-squares estimation technique may be used to compute the transformations.

The ICP algorithm, being an iterative algorithm, continues, until some pre-condition is satisfied, the steps of matching the points of the point cloud 400 to the sides of the bounding box 500 and finding the best transformation to apply to the bounding box 500 that jointly minimizes the distances between the points of the point cloud 400 and the sides of the bounding box 500. The pre-condition can be any appropriate pre-condition for determining when the ICP algorithm should terminate. In one example, the pre-condition can be based on the error metric, where and when the error becomes smaller than some threshold, the ICP algorithm stops.

Figure 5B:
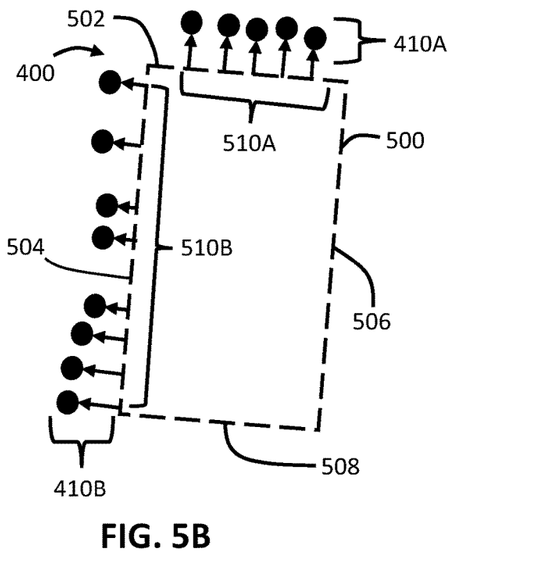
Figure 5C:
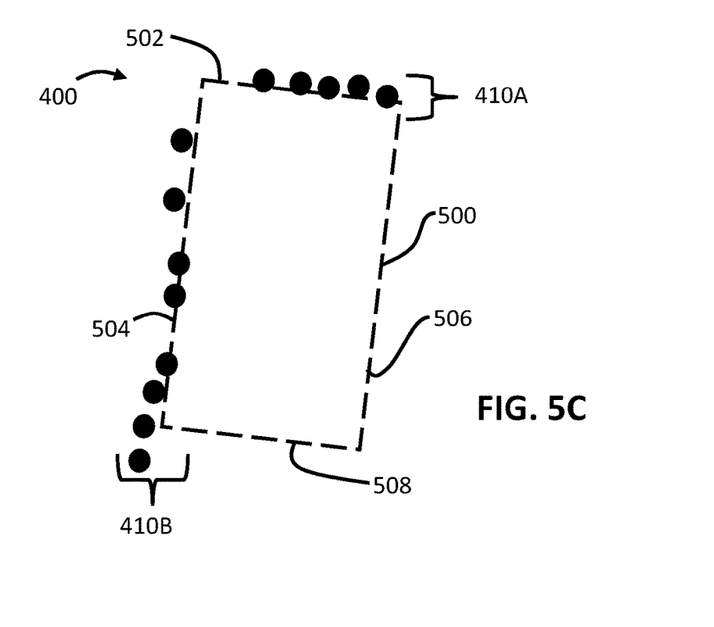

As such, referring to FIG. 5B, illustrated is the bounding box 500 that has had s transformation applied to it that jointly minimizes the distance between the points of the point cloud 400 and the sides of the bounding box 500. In comparison to the bounding box of FIG. 5A, the bounding box 500 of FIG. 5B has had its rotation and translation adjusted to better match the points of the point cloud 400. As mentioned in the paragraph above, this iterative approach continues until some pre-condition is satisfied. For example, FIG. 5C illustrates the transformed bounding box 500 after the ICP algorithm has terminated. As can be seen in FIG. 5C, the bounding box 500 more closely aligns with the points of the point cloud 400.

In the example shown in FIGS. 5A-5C, the transformation applied to the bounding box 500 includes both the translation and rotation of the bounding box 500. As such, the bounding box 500 has both been rotated and translated such that it better matches the points of the point cloud 400.

Figure 6A:
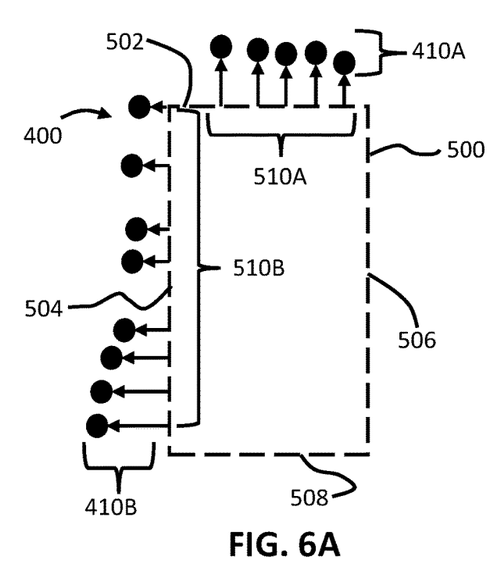
FIGS. 6A-6C illustrate an example of the rotation, translation, and scale of a bounding box being iteratively optimized using an ICP algorithm.
Figure 6B:
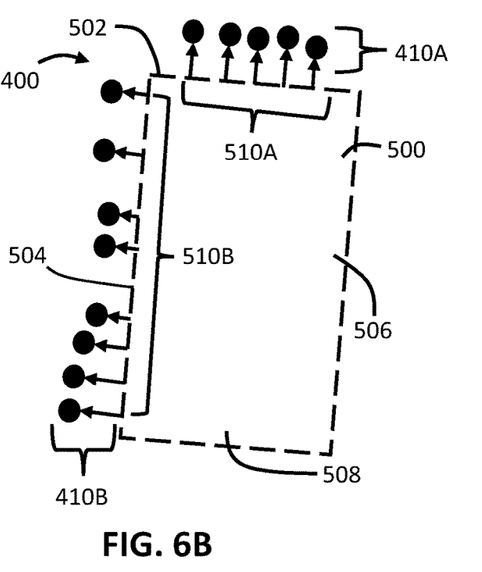
Figure 6C:
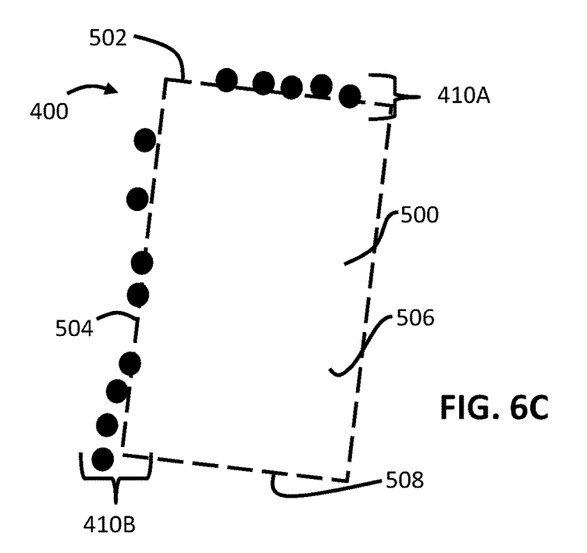

However, it should also be understood that the ICP algorithm can also be applied to determining a transformation that includes a scaling factor. As such, the bounding box 500 can be scaled such that the size of the bounding box more closely represents the size of the object, as indicated by the points of the point cloud 400. For example, FIGS. 6A-6C illustrate several iterations of applying an ICP algorithm that generates transformations that also include a scaling factor. In this example, the bounding box 500 is not only translated and rotated to better match the points of the point cloud 400 but is also scaled so that the size of the bounding box better matches the points of the point cloud 400.

Figure 7:
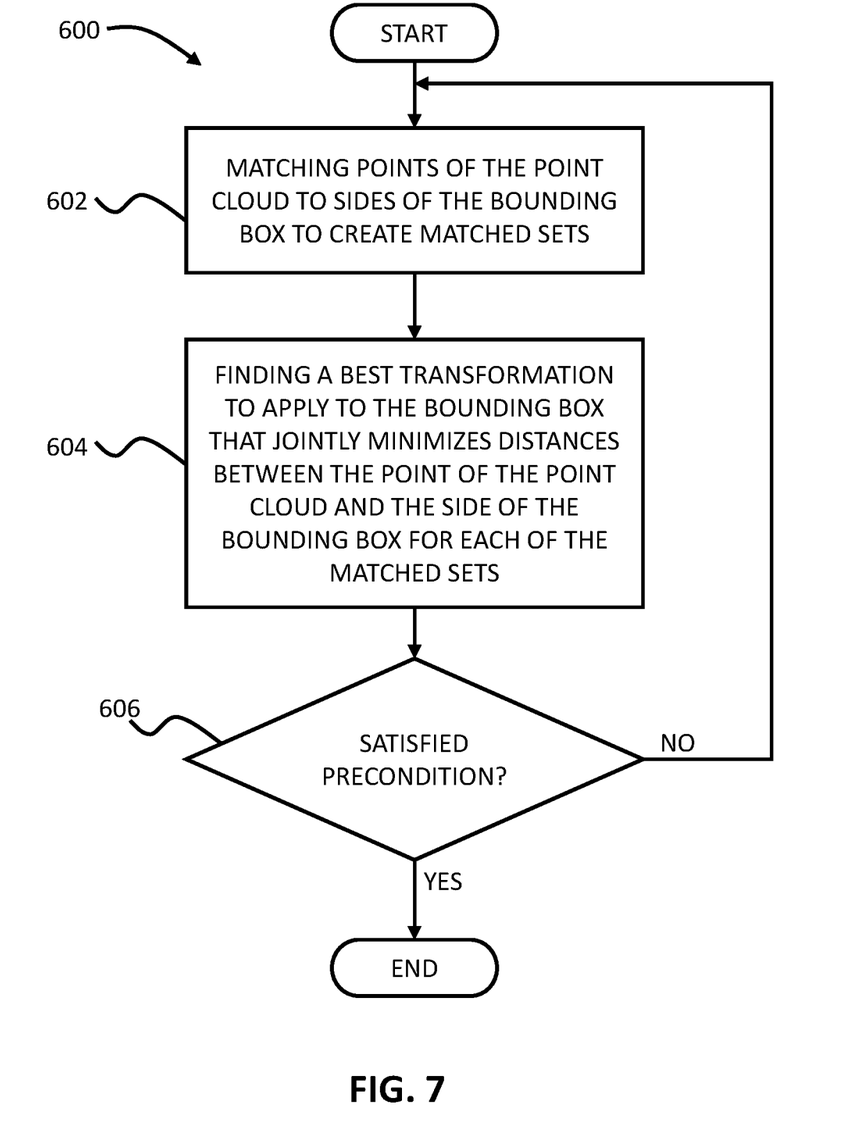
FIG. 7 illustrates a method for optimizing a bounding box.

Referring to FIG. 7, a method 600 for optimizing a bounding box is shown. The method 600 will be described from the viewpoint of the vehicle 100 of FIG. 1 and the bounding box optimizing system 170 of FIG. 2. However, it should be understood that this is just one example of implementing the method 600. While method 600 is discussed in combination with the bounding box optimizing system 170, it should be appreciated that the method 600 is not limited to being implemented within the bounding box optimizing system 170, but is instead one example of a system that may implement the method 600. When describing the method 600, reference will also be made to FIGS. 5A-5C and 6A-6C.

In step 602, the optimizing module 192 includes instructions that, when executed by the processor(s) 110, cause the processor(s) 110 to match the points 410A and 410B to the closest side of the bounding box 500 for each of the points 410A and 410B of the point cloud 400. Moreover, in one example, the ICP algorithm, for each of the points 410A and 410B of the point cloud 400, matches the points 410A and 410B to the closest side of the bounding box 500. Generally, to determine which of the points are closest to a particular side of the bounding box 500, distances are measured between the points of the point cloud and the sides of the bounding box 500. The distances may be perpendicular distances between the points of the point cloud and the sides of the bounding box 500. As such, each of the points 410A and 410B are matched to a particular side of the bounding box 500 and create a matched set, where each point is matched to a side.

In step 604, the optimizing module 192 includes instructions that, when executed by the processor(s) 110, cause the processor(s) 110 to find the best transformation to apply to the bounding box 500 that jointly minimizes the distances 510A and 510B between the points of the point cloud and the sides 502 and 504, respectively, for each of the matched sets. As explained previously, the ICP algorithm uses the points 410A and 410B as the reference and the bounding box 500 as the source. As such, the points 410A and 410B are kept fixed, while the bounding box 500 is transformed to best match the points 410A and 410B.

In step 606, the optimizing module 192 includes instructions that, when executed by the processor(s) 110, cause the processor(s) 110 to determine if a particular pre-condition has been satisfied. The pre-condition can be any appropriate pre-condition for determining when to end the execution of the method 600. In one particular example, the pre-condition can be based on the error metric, where and when the error becomes smaller than some threshold, the ICP algorithm stops. In one example, the error metric may be the distances 510A and 510B. When the distances 510A and 510B fall below some threshold, the pre-condition may be satisfied, causing the method to end. Otherwise, the method returns to step 602 and iteratively continues until the pre-condition is satisfied.

Using the systems and methods described herein, bounding boxes can be optimized to best match point clouds on which they are based. Moreover, by utilizing an ICP algorithm, the bounding boxes can be transformed so that they are more exact in comparison to the point clouds. This is advantageous, as the more precise the bounding boxes are, the more reliable they are when used in downstream processes, such as path planning.

FIG. 1 will now be discussed as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by autonomous driving system 160 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use. The term "operatively connected," as used throughout this description, can include direct or indirect connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mail- boxes, large rocks, and hills. The static obstacles can be objects that extend above ground level. The one or more static obstacles included in the static obstacle map(s) 118 can have location data, size data, dimension data, material data, and/or other associated data. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensor(s) 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensor(s) 124, one or more sonar sensors 125, and/or one or more camera sensor(s) 126. In one or more arrangements, the one or more camera sensor(s) 126 can be high dynamic range (HDR) cameras or infrared (IR) cameras.

The vehicle 100 can include an input system 130. An "input system" includes any device, component, system, element or arrangement, or groups that enable information/data to be entered into a machine. The input system 130 can receive an input from a vehicle passenger (e.g., a driver or a passenger). The vehicle 100 can include an output system 135. An "output system" includes any device, component, arrangement, or groups that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust and/or alter one or more of the vehicle systems 140 or components thereof to respond to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. As used herein, the term "plurality" is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for optimizing a bounding box that was generated based on a point cloud using an iterative closest point (ICP) algorithm, the system comprising:
    a processor; and
    a memory in communication with the processor, the memory storing an optimizing module having instructions that, when executed by the processor, cause the processor to iteratively perform until a predetermined condition is satisfied:
        match points of the point cloud to sides of the bounding box to create matched sets, wherein the matched sets include a point of the point cloud and a side of the bounding box; and
        find a best transformation to apply to the bounding box that jointly minimizes distances between the point of the point cloud and the side of the bounding box for the matched sets.

2. The system of claim 1, wherein the distances are perpendicular distances between the points of the point cloud and the sides of the bounding box.

3. The system of claim 1, wherein the best transformation is a rotation and translation of the bounding box.

4. The system of claim 1, wherein the best transformation is a rotation, translation, and scaling of the bounding box.

5. The system of claim 1, wherein the point cloud is a LIDAR point cloud.

6. The system of claim 1, wherein the point cloud is a pseudo-LIDAR point cloud.

7. A method for optimizing a bounding box that was generated based on a point cloud using an iterative closest point algorithm (ICP), the method comprising iteratively performing, until a predetermined condition is satisfied, the steps of:
    matching points of the point cloud to sides of the bounding box to create matched sets, wherein the matched sets include a point of the point cloud and a side of the bounding box; and
    finding a best transformation to apply to the bounding box that jointly minimizes distances between the point of the point cloud and the side of the bounding box for the matched sets.

8. The method of claim 7, wherein the distances are perpendicular distances between the points of the point cloud and the sides of the bounding box.

9. The method of claim 7, wherein the best transformation is a rotation and translation of the bounding box.

10. The method of claim 7, wherein the best transformation is a rotation, translation, and scaling of the bounding box.

11. The method of claim 7, wherein the point cloud is a LIDAR point cloud.

12. The method of claim 7, wherein the point cloud is a pseudo-LIDAR point cloud.

13. A non-transitory computer-readable medium storing instructions for optimizing a bounding box that was generated based on a point cloud using an iterative closest point algorithm (ICP) that, when executed by a processor, causes the processor to iteratively perform until a predetermined condition is satisfied:
    match points of the point cloud to sides of the bounding box to create matched sets, wherein the matched sets include a point of the point cloud and a side of the bounding box; and
    find a best transformation to apply to the bounding box that jointly minimizes distances between the point of the point cloud and the side of the bounding box for the matched sets.

14. The non-transitory computer-readable medium of claim 13, wherein the distances are perpendicular distances between the points of the point cloud and the sides of the bounding box.

15. The non-transitory computer-readable medium of claim 13, wherein the best transformation is a rotation and translation of the bounding box.

16. The non-transitory computer-readable medium of claim 13, wherein the best transformation is a rotation, translation, and scaling of the bounding box.

17. The non-transitory computer-readable medium of claim 13, wherein the point cloud is at least one of a LIDAR point cloud and a pseudo-LIDAR point cloud.

* * * * *